United States Patent [19]

Chur

[11] 3,906,326

[45] Sept. 16, 1975

[54] FINE AND COARSE TRACK POSITIONING SYSTEM FOR A TRANSDUCER IN A MAGNETIC RECORDING SYSTEM

[75] Inventor: Sung Pal Chur, San Jose, Calif.

[73] Assignee: Caelus Memories Inc., San Jose, Calif.

[22] Filed: June 3, 1970

[21] Appl. No.: 43,116

[52] U.S. Cl. ................ 318/594; 318/640; 318/616; 318/576; 360/106

[51] Int. Cl.$^2$ .......................................... G05B 11/18

[58] Field of Search ........... 318/561, 576, 594, 602, 318/604, 616, 640; 360/106

[56] References Cited

UNITED STATES PATENTS

| | | | |
|---|---|---|---|
| 2,907,937 | 10/1959 | Apgar et al. | 318/594 |
| 3,105,963 | 10/1963 | Stevens et al. | 318/576 X |
| 3,156,906 | 11/1964 | Cummins | 318/576 X |
| 3,193,744 | 7/1965 | Seward | 318/640 X |
| 3,226,617 | 12/1965 | Smith et al. | 318/594 |
| 3,292,168 | 12/1966 | Gray | 318/576 X |
| 3,362,021 | 1/1968 | Ma et al. | 318/576 X |
| 3,372,321 | 3/1968 | Inaba et al. | 318/594 |
| 3,426,337 | 2/1969 | Black et al. | 318/576 X |
| 3,458,785 | 7/1969 | Sordello | 318/594 X |
| 3,512,060 | 5/1970 | Floyd | 318/616 X |

*Primary Examiner*—T. E. Lynch
*Attorney, Agent, or Firm*—Lindenberg, Freilich, Wasserman, Rosen & Fernandez

[57] ABSTRACT

A linear positioning system is disclosed for precisely aligning magnetic transducer heads with a record medium as commanded by an address. Digital address signals are converted to an analog form to drive a linear motor which moves a transducer head to an approximation of the desired position. A servo loop incorporating a differentiator operates to stabilize the motor. Digital signals that are indicative of the final position are applied to an optical detent system to finally position the transducer heads and hold them in such position during a transducing interval.

10 Claims, 8 Drawing Figures

INVENTOR

SUNG PAL CHUR

BY,

Nilsson, Robbins, Wills & Berliner

Attorneys.

INVENTOR.
SUNG PAL CHUR
BY
Nilsson, Robbins, Wills & Berliner
Attorneys.

INVENTOR.
SUNG PAL CHUR
BY
Nilsson, Robbins, Wills & Berliner
Attorneys.

INVENTOR.
SUNG PAL CHUR
BY
Nilsson, Robbins, Wills & Berliner
Attorneys.

FINE AND COARSE TRACK POSITIONING SYSTEM FOR A TRANSDUCER IN A MAGNETIC RECORDING SYSTEM

BACKGROUND AND SUMMARY OF THE INVENTION

In recent years dynamic magnetic recording has come into widespread use wherein a relatively small surface is readily accessible to a magnetic transducer for sensing or recording limited quantities of data with a short access time. The provision of a magnetic recording surface on both drums and discs has been proposed in this regard. Assuming the exemplary structure of a disc, conventionally an arbitrary division thereof is made to define a number of concentric annular tracks on the disc, each of which is individually accessible. To record data on an individual track (or sense data therefrom) the magnetic transducer (head) must be accurately positioned with respect to the track. Conventionally, the disc is rotated at a substantially constant speed in relation to the head which is moved radially to attain selected communication positions with the different tracks.

Although various forms of transducers and magnetic recording surfaces have been proposed, a practice that is in widespread use involves operating the head so that it does not actually contact the disc surface; rather the head is positioned in very close proximity to the surface. In such systems, the head may be freely movable in a direction normal to the recording surface.

Prior systems as considered above have been developed to a point where the width of an individual track may be exceedingly small. Consequently, one of the problems involved in systems of the type under consideration is that of accurately locating the transducer head with reference to the recording medium and maintaining such a positional relationship during a "sense" or "record" operation.

Pursuing the assumed example of a magnetic disc, conventional systems have been built to position the head over a preselected track which is identified by a signal-represented address. As a specific example, signals representative of the number "193" would command positioning the head over track number one ninety-three in the order of arrangement. However, a continuing need exists for an improved system to precisely position a magnetic transducer head in relation to a moving magnetic disc, in response to a signal-represented address. In view of the relatively-close tolerances involved in systems of this type, precision and smoothness of movement are exceedingly important in addition to economy. Shock-creating mechanisms as well as structures having vibrational characteristics are generally undesirable.

In general, the present invention resides in a positioning system as for placing a magnetic transducer in a predetermined positional relationship with a magnetic record member in accordance with an address and includes a motor for moving the transducer relative to the record member, first in response to an analog signal representative of the address and second in response to an optical detent digital arrangement which obtains and maintains final positioning. Stability in the system is enhanced by differentiating a position-indicating signal to obtain a velocity signal which is fed back to servo the motor control.

BRIEF DESCRIPTION OF THE DRAWINGS

In the drawings which constitute a part of this specification, an exemplary embodiment demonstrating various objectives and features hereof is set forth, specifically.

DESCRIPTION OF THE ILLUSTRATIVE EMBODIMENT

As required, a detailed illustrative embodiment of the invention is disclosed herein. The embodiment exemplifies the invention which may, or course, be constructed in various other forms, some of which may be radically different from the illustrative embodiment. However, the specific structural and functional details disclosed herein are representative and provide a basis for the claims herein which define the scope of the present invention.

Figure 1:
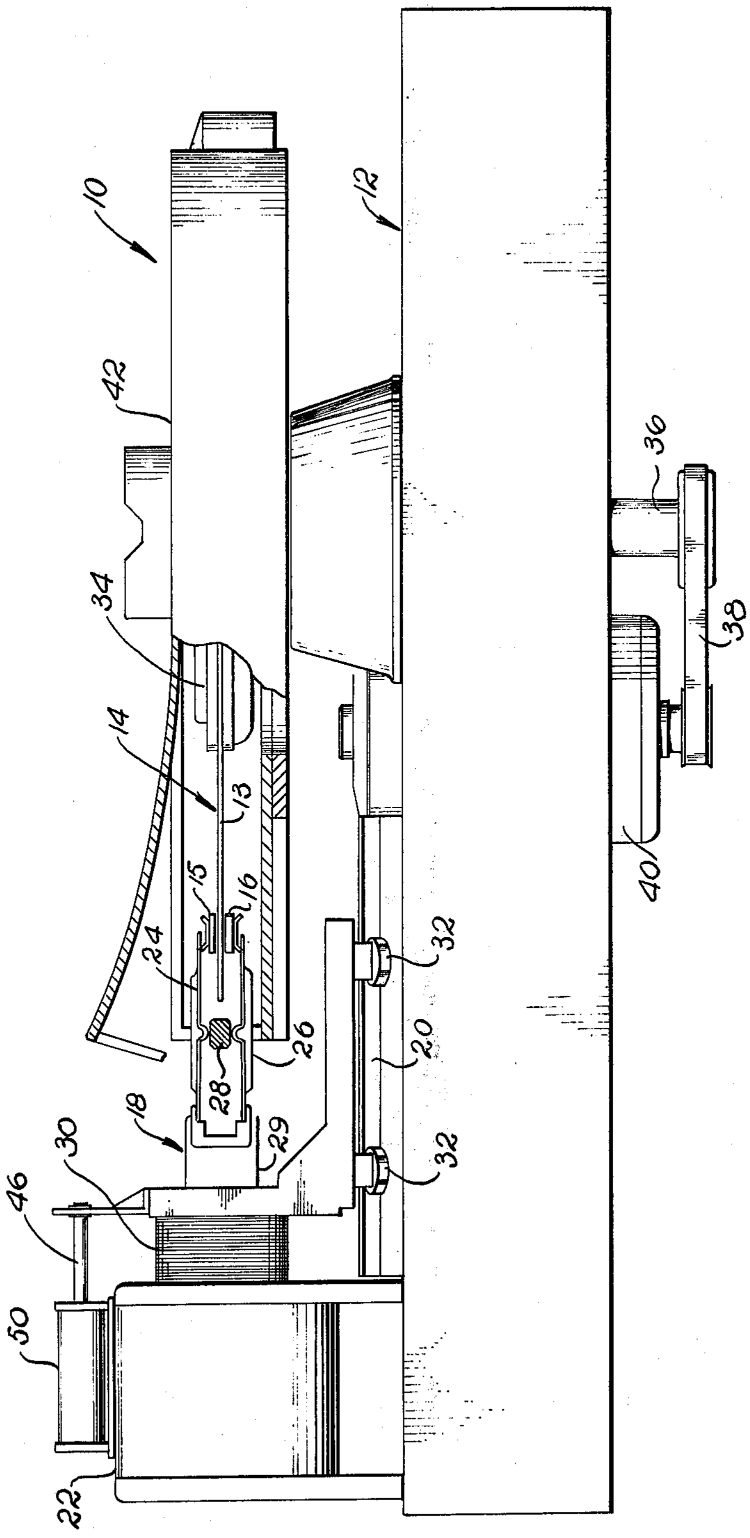
FIG. 1 is a side elevation view of a dynamic magnetic memory system incorporating the present invention.

Referring initially to FIG. 1, there is shown a disc cartridge 10 in operative relationship with a disc drive 12. The disc cartridge 10 includes a rotatably-mounted disc 14 having magnetic recording medium on both faces 13 thereof which are recorded upon and sensed by a pair of magnetic read write heads 15 and 16. The heads 15 and 16 are variously positioned with respect to the disc 14 by a carriage 18 that is supported by a rail 20 and is actuated by a linear motor 22.

The heads 15 and 16 are spaced-apart from the record 14 and during sense (read) and record (write) operations may "fly" upon a layer of air developed by the revolving disc 14 as well known in the prior art. The heads 15 and 16 are individually supported by arms 24 and 26 which are spaced apart by a block 28 and which are affixed by a beam 29 to a movable coil 30 comprising a component of the linear motor 22 and the carriage 18.

The carriage 18 is supported upon rollers 32 which engage the rails 20 so as to enable the carriage 18 to carry the heads 15 and 16 along a linear radially-extending path over the disc 14. Thus, depending upon the signals applied to the linear motor 22 the carriage 18 is variously disposed to place the head 15 and 16 above particular annular tracks that are arbitrarily defined upon the disc 14. Linear motors which may be employed as the motor 22 as well known in the prior art that are responsive to amplitude-modulated signals to assume various positions in response to predetermined levels of such signals.

The motion of the carriage 18 carrying the heads 15 and 16 is generally somewhat intermittent; however, the revolution of the disc 14 is continuous and substantially constant. In that regard, the disc 14 is carried upon a support hub 34 which is coupled through a shaft 36 and a belt 38 to a rotary drive motor 40. Accordingly, the disc 14 revolves with reference to a stationary housing 42 incorporating an access door 44. Summarizing the operation of the structure as shown in FIG. 1, while the disc 14 continuously revolves at a substantially-constant speed, the motor 22 responds to signal-represented addresses and actuates the carriage 18 to position the heads 15 and 16 in communication with preselected magnetic recording tracks. Of course, a track may receive freshly-recorded signals or may have signals sensed therefrom which have been previously recorded. Thus, the system provides a sizable quantity of storage capacity that is available with relatively-short access time.

As indicated above, the linear motor 22 is responsive to different signal amplitude levels to variously position the carriage 18. The development of the actual drive signals for the linear motor 30 also involves the utilization of signals indicative of the instant position of the carriage 18. That is, the carriage may be assigned a positive and a negative direction of movement which are related to the movement accomplished by developed positive and negative values of signals that are applied to the linear motor 22.

The carriage 18 is coupled by a rod 46 to a linear potentiometer 50. The potentiometer 50 incorporates a sliding contact which receives a direct-current signal that varies directly as the position of the carriage 18. Of course, the potentiometer 18 may be variously mounted and positioned other than as shown in FIG. 1. The position signal from the potentiometer is combined with an analog of the desired position to develop a drive signal for the motor 22.

In the operation of the system, the linear motor 22 is initially responsive to a signal level (amplitude) to coarsely position the carriage 18. When such coarse positioning has been attained, the motor 40 is next responsive to a digitally-developed servo signal which accomplishes and maintains the fine positioning of the heads 15 and 16 in relation to the disc 14. Considering the details of the system, reference will now be made to FIG. 2 inwhich certain elements are represented that are common to FIG. 1. Although different forms of representation may be used, similar identification numerals are employed in the figures. Specifically, in FIG. 2, the disc 14 is indicated in relation to the head 15 borne by the carriage 18 which is controlled by the linear motor 22. The head 15 is shown with conductors 52 emerging therefrom, which carry the signals as sensed, or, to be recorded, upon the disc 14. Various forms of structure for providing and processing such signals are well known in the prior art.

Figure 2:
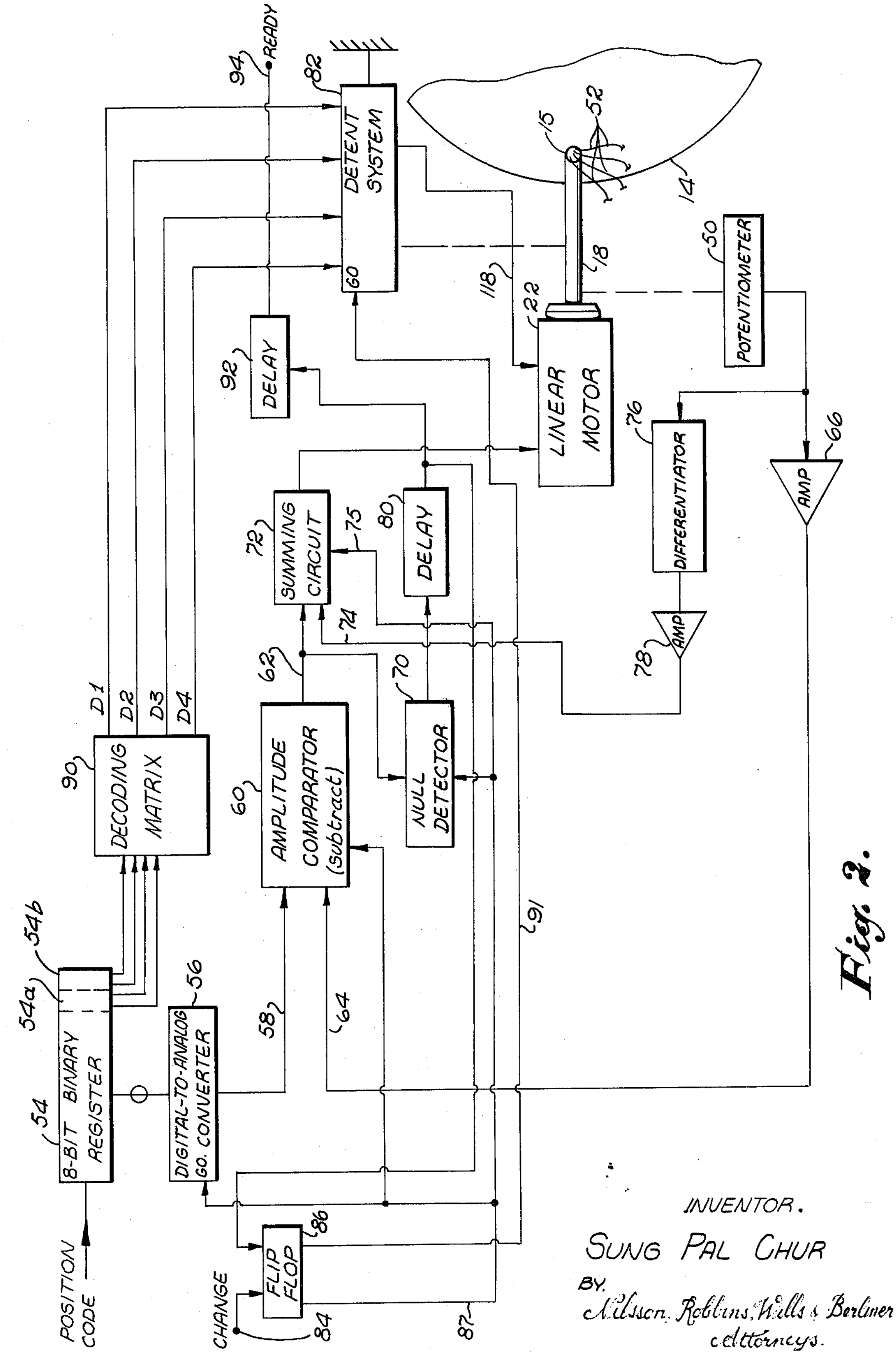
FIG. 2 is a block and schematic diagram illustrative of the electrical system embodied in the structure of FIG. 1.

Approaching the system of FIG. 2 at the control input (somewhat diametically, from the disc 14) the address signals indicative of the desired position for the head 15 are received by a register 54 (upper left) and in that regard, the position code may comprise an eight bit binary number. The contents of the register 54 is supplied to a digital-to-analog converter 56, as well known in the art, which provides an amplitude level that is indicative of the position code number. The analog signal level output from the converter 56 is supplied through a line 58 to an amplitude comparator 60. Various forms of circuits and structures for comparing the amplitude of two signals to produce their difference are well known in the prior art and in one exemplary form, the amplitude comparator 60 may comprise simply an analog subtraction unit for providing a positive or negative difference signal in an output line 62.

The other input to the comparator 60 is through a line 64, and is from the current position-indicating potentiometer 50 which is connected to the line 64 through an amplifier 66. The comparator 60 also has a control input through a line 68 which carries a binary signal to command the operation of the comparator 60 upon receipt of a high level. Summarizing, the amplitude comparator 60 provides a signal to a line 62 which manifests the difference between the desired position for the head 15 and the instant position of the head 15. That is, the input to the comparator 60 through the line 58 is amplitude modulated to manifest the desired position for the head 15 while the input through the line 64 is amplitude modulated to indicate the instant position of the head 15. Accordingly, the difference between the two inputs, as carried in the line 62, manifests the necessary change to attain the desired position for the head 15.

The line 62 is connected to a null detector 70 and to a summing circuit 72. The summing circuit 72 receives another input through a line 74 which is a stabilizing input and which is considered below. The output from the summing circuit 72 is to the linear motor 22 to command the necessary directional movement of the carriage 18 to attain the desired positional relationship of the head 15 with reference to the disc 14. Note that the operation of the summing circuit 72 is conditional upon the presence of a high value of a binary control signal in a conductor 75.

As the carriage 18 moves, the potentiometer 50 provides a varying positional signal that is applied to the amplifier 66 as explained above, and is additionally applied to a differentiator 76. The output from the differentiator 76 is accordingly the differential of position, i.e. velocity. That is, the output from the differentiator 76 is a signed signal, the amplitude of which is indicative of the velocity of the carriage 18. That velocity signal is applied, through an amplifier 78 and the line 74 to the summing circuit 72. Accordingly, the velocity signal is inverted by the amplifier 78 and applied to the summing circuit 72 in opposition to the comparator singal in line 62, to stabilize the drive signal for the linear motor 40. For example, as the linear motor 40 actuates the carriage 18 with increasing speed, in a positive direction, the velocity-representative signal provided from the differentiator 76 is inverted and combined with the difference signal from the comparator 60 to reduce the amplitude of the signal which actually commands movement by the linear motor 40. Accordingly, stabilization and servo feedback control are accomplished.

When the linear motor 40 has attained approximately the desired positional relationship of the carriage 18 to the disc 14, the output from the comparator 60 becomes null and that null is detected by the null detector 70. Upon the sensing of a null condition, the null detector 70 provides a high level of a binary signal to a delay circuit 80 and coincidentally resets a flip flop 86. The output from the delay circuit 80 actuates a detent system 82 as described in detail below. The detent system 82 functions in a digital manner to sense the instant position of the carriage 18 in relation to a stable reference to thereby attain and maintain the desired head position over the disc 14.

The details of the detent system are considered below; however, preliminarily, a summary of the sequence of operation of the system of FIG. 2 may be helpful in accomplishing a complete understanding hereof. In that regard, assume initially that an address or position code in the form of binary signals is received in the register 54. Assume further that the high state of a binary signal (commanding a change) is applied to a terminal 84 to set a flip flop 86 which initiates the preliminary operation of the system to set the head 15 over the track identified by the address contained in the register 54.

The set state of the flip flop 86 results in a high level for a binary signal output to a conductor 87 which actuates: the converter 56, the comparator 60, the null detector 70, the summing circuit 72 and additionally releases the detent system 82 as the "set" input thereto coincidentally becomes low to inactivate that system. In effect, the binary signal applied to the detent system 82 from the flip flop 86 through conductors 91 is the negation of the detent system signal in conductor 87.

When the digital-to-analog (DAC) converter 56 is actuated by the flip flop 86, an amplitude level (indicative of the desired head to track position) is supplied from the converter to the amplitude comparator 60. Assuming that the head 15 is in a location that is remote from the desired location, the output from the comparator 62 has a significant amplitude which is representative of the differential as considered above. In the event that the signal in the conductor 62 is at a relatively high level, the initial output from the summing circuit 72 will be high, commanding the linear motor 22 to move the head 15 to the desired location. Energized by such a relatively-high signal, the linaer motor initiates a rapid motion of the head 15, the velocity of which motion is provided as a velocity signal from the differentiator 76 as explained above and applied to reduce the output from the summing circuit 72. Accordingly, a feedback servo loop is accomplished whereby the signal applied to the linear motor 22 from the summing circuit 72 tends to bring the head 15 close to the desired positional location.

When the linear motor 22 reaches approximately the desired location, the output from the potentiometer 50 through the amplifier 66 approximately coincides to the output from the digital-to-analog converter 56. Thereupon, the null detector 70 detects a null in the output from the comparator 60 to initiate an interval of delay incurred by a delay circuit 80. After the passage of a brief interval of time during which the moving components are permitted to stabilize, the delay circuit 80 provides a high state of a binary signal to reset the flip flop 86 thereby initiating the operation of the detent system 82. As a result, the detent system 82 becomes operative to finally position the head 15 with reference to the disc 14.

The detent system 82 receives four inputs: D1, D2, D3 and D4 from a decoding matrix 90 which is connected to receive binary signals representative of the two-least significant digits registered in stages 54*a* and 54*b* of the register 54. Accordingly, as described in detail below, the detent system 82 finally positions the head 15 by actuating the linear motor 22 to a precisely-controlled position as indicated by the two least-significant digits of the binary position signal. Thus, initially the head 15 is rapidly moved to approximately the desired position after which the output from the amplitude comparator 60 is rendered ineffective by disabling the summing circuit 72 when the output from the null detector 70 resets the flip flop 86. Concurrently, the delay circuit 92 is actuated to initiate another delay interval after which the head position is correctly established.

In considering the operation of the detent system 82, it is noteworthy that the decoding matrix 90 may take any of a variety of different forms wherein two binary digit signals are decoded to provide one of four output exclusively high. That is, the four outputs from the decoding matrix 90 carry four binary signals, D1, D2, D3 and D4, one of which is high depending upon the received binary code value. The utilization of the signals D1, D2, D3 and D4 is considered in detail below in the detailed explanation of the detent system 82. These signals may be based on the least-significant digits of the position code value as follows:

| | |
|---|---|
| 00 | D1 |
| 01 | D2 |
| 10 | D3 |
| 11 | D4 |

Figure 3:
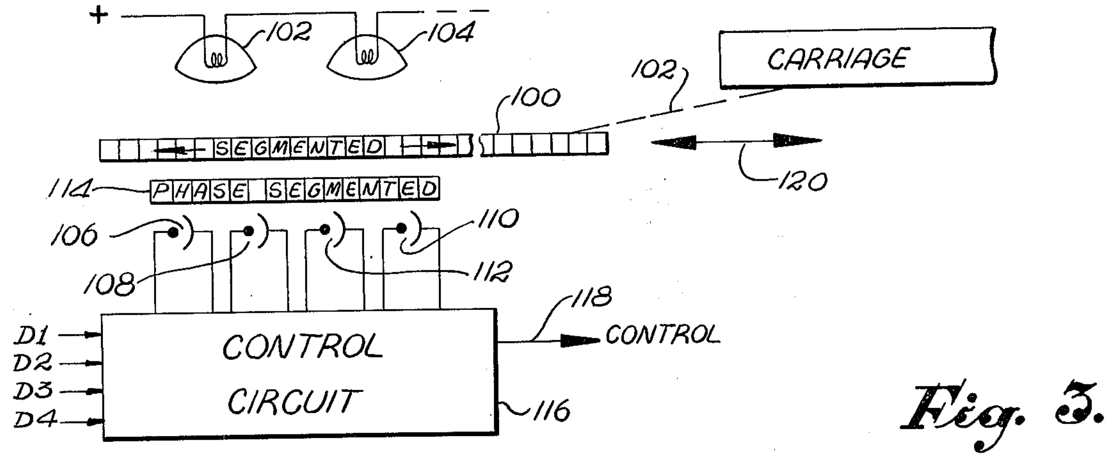
FIG. 3 is a block and schematic diagram of a detailed portion of the system of FIG. 2.

Referring now to FIG. 3, the details of the detent system 82 are shown in somewhat planar form, to include a uniformly opaque-and-clear segmented optical index 100 which is connected to the carriage 18 as indicated by the dashed line 102. The index 100 carries alternate opaque and light-transmissive sections in the uniform arrangement and is fixed to the carriage 18 to be moved between a pair of lamps 102 and 104 and four photo detectors 106, 108, 110 and 112 which are masked by a phase-segmented mask 114. The photo detectors 106, 108, 110 and 112 are connected to a control circuit 116 which receives the signals D1, D2, D3 and D4 and which provides a signed signal output to a conductor 118 which is connected to drive the linear motor 22 (FIG. 2) to attain and hold the precisely desired position for the head 15.

Summarizing the operation of the detent system as shown in FIG. 3 in advance of a detailed consideration, of the structure, the index 100 moves with the carriage as indicated by the arrows 120 and with reference to the stationary members including: the lamps 102 and 104, the mask 114 and the photo detectors 106, 108, 110 and 112. The mask 114 has four distinctly different (phase displaced) sections for selective alignment with the uniform segmented apertures of the index 100. In effect, the high value of one of the binary signals D1, D2, D3 and D4 indicates a selection of one of four alignment possibilities between the mask 114 and the index 100. Accordingly, in a manner somewhat analogous to a mechanical detent structure the control circuit 116 provides a control signal through the conductor 118 to drive the motor 22 (FIG. 2) to position and hold the index 100 (FIG. 3) as well as the carriage 118, in a select precisely-defined position as defined by the two least-significant digits of the position address number. Accordingly, it may be seen that the initial positioning of the carriage 18 (as well as the head 15) is accomplished by an analog structure; however, the final positioning of the head 15 involves digital indexing to accomplish precisely the position commanded by an address position code.

Figure 4:
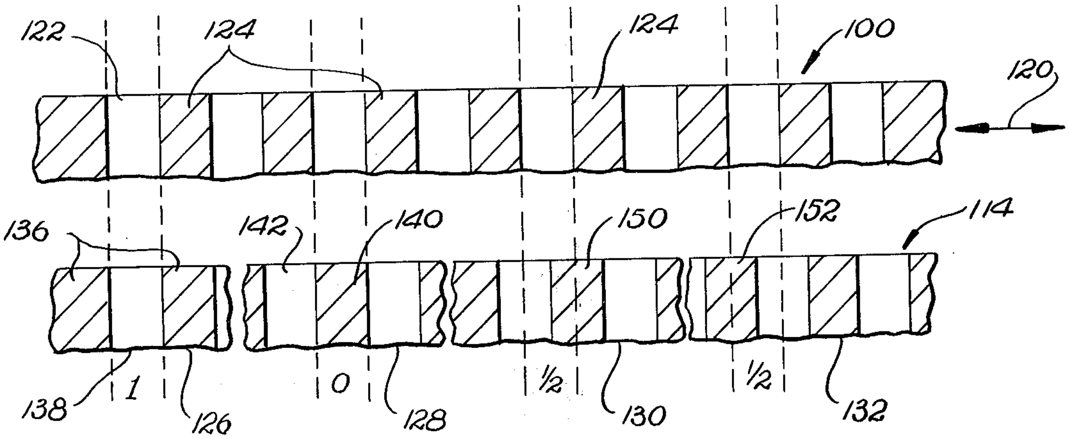
FIG. 4 is an enlarged fragmentary representation of a portion of the structure of FIG. 3.

Prior to explaining the operation of the optical detent system in complete detail, the optical formats of the index 100 and the mask 114 will be considered in reference to FIG. 4. These elements, as shown in FIG. 4 are grossly enlarged and represented in planar relationship rather than parallel as they are mounted in the system.

The index 100 is uniformly segmented into alternate clear areas 122 (light transmissive) and opaque areas 124 (light blocking). The areas 122 and 124 are of equal length and uniformly alternate along the length of the index 100. The stationary mask 114 also includes clear and opaque areas; however, such areas are uniformly defined thereon in four different sections. That is, the mask 114 is divided into four sections along the length, with the opaque-clear segments in the four sections offset in phase quadrature. Fragments 126, 128, 130 and 132 of the four sections respectively are represented in FIG. 4. The relative position between the mask 114 and the index 100 changes; however, for reference purposes, and in order best understood, the relationship of the fragments 126, 128, 130 and 132, with respect to each other and to the index 100, assume initially that the mask 114 is in one positional alignment in relation to the index 100 as shown. In such a positional relationship, the fragment 126 has opaque sections 136 which are precisely aligned with the opaque sections 124 of the index 100. Similarly, the clear sections 138 of the mask 114 are aligned with the clear sections 122 of the index 100. On the contrary, the fragment 128 is in phase opposition to the mask 100. Specifically, the opaque sections 140 of the fragment 128 are aligned with the clear sections 122 of the index 100. Similarly, the opaque sections 124 of the index 100 are aligned with the clear sections 142 of the fragment 128. Accordingly, the fragment 126 is aligned with the index 100 to provide the greatest light transmission therethrough while the fragment 128 is positioned with reference to the index 100 in the most effective light-blocking position. Though parallel mounted in the system hereof, such is the relationship of the segments. Accordingly, the relationship of the fragment 126 to the index 100 may be considered to pass a quantity of light arbitrarily valued at "1" while the position of the fragment 128 with reference to the index 100 may be considered to have a light transmissivity of "0".

The fragments 130 and 132 are offset between the positions of the fragments 126 and 128. Specifically, the opaque sections 150 of the mask 114 are offset by half their width to the left of the opaque sections 124 of the index 100. On the contrary, the opaque sections 152 of the fragment 114 are offset similarly to the right of the opaque sections 124 of the index 100. Accordingly, the relative positions of the fragments 130 and 132 with reference to the index 100 is such that, in the scale adopted, the quantity of light passed by each will be "½".

Figure 5:
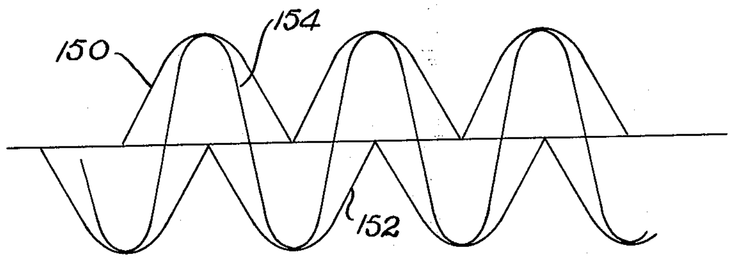
FIG. 5 shows waveforms representative of electrical signals developed in the system of FIG. 2.
Figure 6:
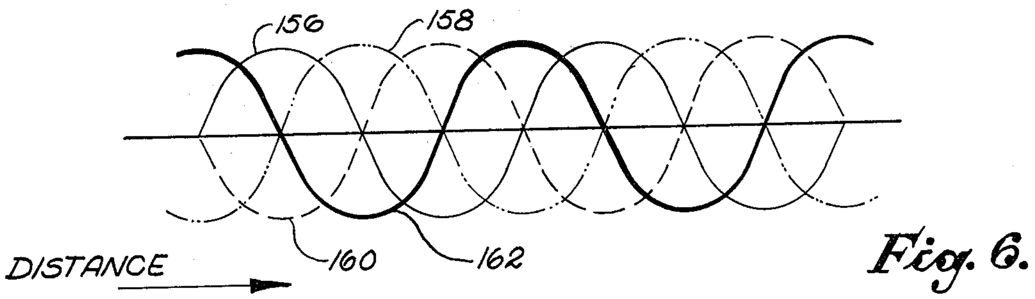
FIG. 6 shows waveforms of signals that may be developed in the system.

It is to be understood that the represented fragments 126, 128, 130 and 132 are portions of segments along the length of the mask 114. Each such segment has one of the photo detectors 106, 108, 110 and 112 (FIG. 3) positioned behind it so as to sense the light passing through the combined light passages of the index 100 and the mask 114. Accordingly, it may be seen that if the index 100 is moved as indicated by the arrows 120 in relation to the stationary mask 114 the photo detectors behind each fragment will each detect a signal which varies from zero to a peak amplitude and then returns to zero. For example, as shown in FIG. 5, the photo detector positioned behind the fragment 126 would provide an output as indicated by the waveform 150 while the output from the photo detector positioned behind the fragment 128 in inverted form would be as represented by the waveform 152. If the two signals represented by the waveforms 150 and 152 are additively combined, the result is a sinusoid as represented by the waveform 154. In that manner, the output signals from the sensors 106 and 108 (FIG. 3) are combined as are the outputs from the photo detectors 110 and 112 which results in the development of two sinusoidal waveforms 156 and 158 in phase quadrature as shown in FIG. 6.

If each of the waveforms 156 and 158 is inverted, waveforms 160 and 162 are provided and consequently four waveforms are developed in phase quadrature which are related to relative movement of the index 100 (FIG. 4) with reference to the mask 114. Assuming the movement is linear, the regular waveforms as shown in FIGS. 5 and 6 will result. That is, each of the waveforms 156, 158, 160 and 162 is a plot of signal amplitude on a base of linear displacement of the index 100 with reference to the mask 114.

Figure 7:
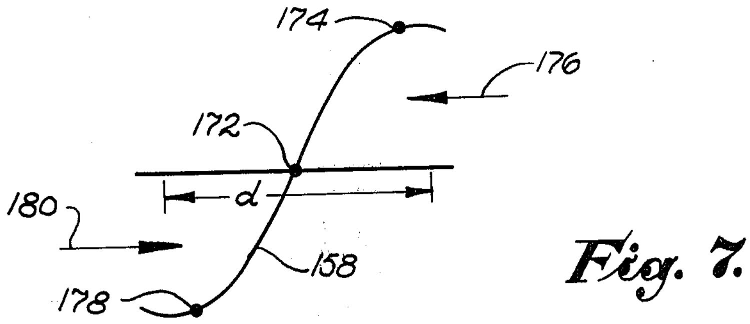
FIG. 7 is a graphical showing of a characteristic curve of a portion of the operating system.

By designating one of the waveforms 156, 158, 160 or 162 by the high state of one of the binary signals D1, D2, D3 or D4, a waveform is selected as an alignment control to accomplish a desired positional relationship for the carriage, i.e. between the index 100 and the mask 114. That is, the four recurring positive-going zero-crossings of the waveforms 156, 158, 160 and 162 (on a linear distance scale) designate four positions of final alignment of the heads to the record as tracks. For example, if the signal D1 is in a high state, the waveform 158 is designated which spans a distance relationship D (FIG. 7) between the index 100 and the mask 114. The objective is to attain the point of alignment indicated at the zero crossing 172 of the signal waveform 158. Accordingly if for example, the relationship between the index 100 and the mask 114 is such that the signal is provided at a point 174, a positive signal of that level energizes the linear motor to move the carriage and the index 100 in the direction indicated by the arrow 176. Conversely, if the relationship between the index 100 and the mask 114 is such that the signal output is at a level indicated by the point 178, the signal output to the linear motor 22 is such as to urge the carriage and the index 100 in the direction resulting in the change as indicated by the arrow 180.

The detent system thus seeks a zero signal output as indicated at the zero crossing 172 at which the position of the carriage is indicated to be precisely correct to sense the desired track on the disc 14 (FIG. 2). The distance *d*, or course, covers a plurality of individual tracks with the result that the optical detenting system as disclosed above obtains the final positioning or precise alignment of the carriage 18 with reference to the record.

Figure 8:
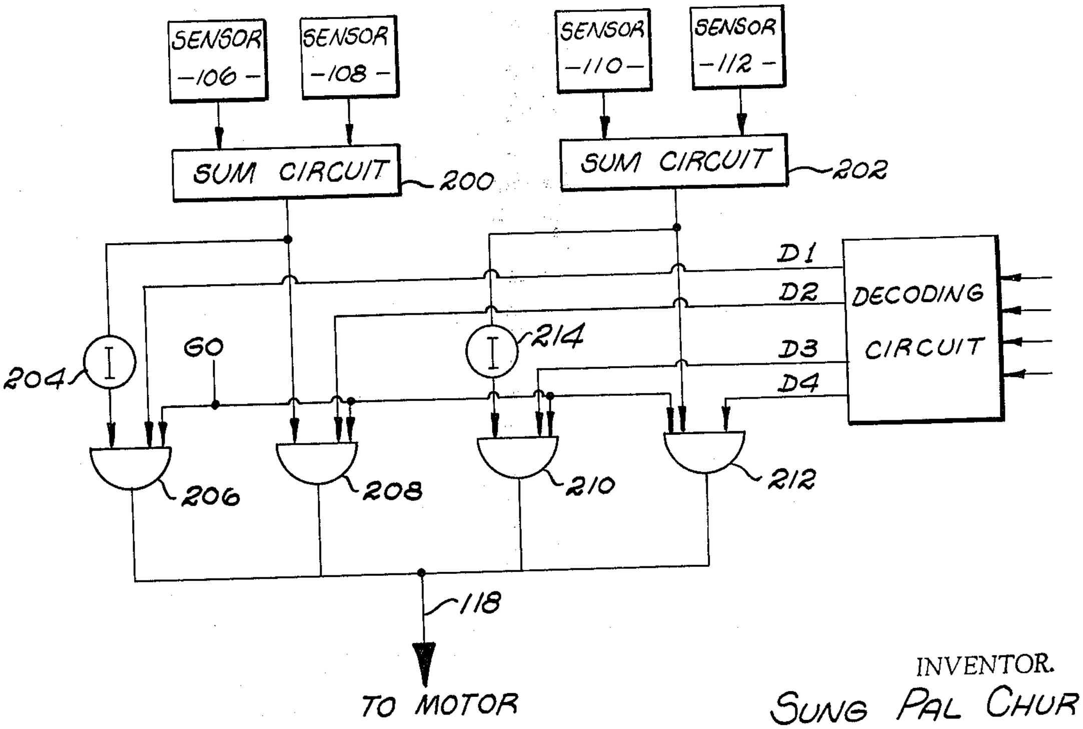
FIG. 8 is a block diagram of a portion of the system of FIG. 3.

In view of the above analytical and graphic explanation of the detent system, the component elements of the system may now be more effectively considered. Specifically, as shown in FIG. 8, the sensors 106, 108, 110 and 112 are represented as blocks which are associated in pairs (106 and 108; 110 and 112) with summing circuits 200 and 202. The summing circuits 200 and 202 thus provide the sinusoidal waveforms 156 and 158 as shown in FIG. 6. The sine wave from the summing circuit 200 is supplied through an inverter 204 to an "and" gate 206 and directly to an "and" gate 208. The "and" gates 206 and 208 along with similar "and" gates 210 and 212 receive the signals D1, D2, D3 and D4 respectively. These gates are qualified only when the optical detent is to be operative under control of the reset signal from the flip flop 86 (FIG. 2).

The "and" gates 210 and 212 also receive the output signal from the summing circuit 202, with the input to the "and" gate 210 passing through an inverter 214. Thus, the individual "and" gates 206, 208, 210 and 212 individually receive the waveforms 160, 156, 162 and 158 respectively. The single one of the "and" gates to be qualified depends upon which of the binary signals D1, D2, D3 or D4 is in a high state. The one of those signals which is exclusively high qualifies one of the "and" gates 206, 208, 210 or 212 to supply a control signal through the output conductor 118 to the linear motor 22. Thus, the system functions to obtain final positioning of the carriage 18 under control of the optical detent system as described above.

In summarizing the operation of the system hereof, some particular features appear somewhat salient. For example, the development of a feedback signal by application of the position signal to a differntiator, specifically a differentiator 76 as shown in FIG. 2, affords an effective feedback loop to stabilize the system hereof and avoid over shooting a desired location by the linear motor. The optical detenting system on a digital sensing basis under control of the input position code, hereof, affords an implementation whereby analog techniques accomplish a preliminary or approximate positioning of the heads then digital techniques are utilized to precisely servo the heads to the desired positional relationship with the disc. As a consequence, the advantages of analog and digital techniques are afforded. Of course, other features are embodied herein and in that regard the significance of the total system hereof involving a combination of separate elements is emphasized as a major improvement in the art.

I claim:

1. A positioning system for placing a magnetic transducer means in a predetermined positional relationship with a magnetic record member in accordance with a numerical value comprising:

motor means for motivating said transducer means relative to a record member;

coarse positioning means including means for providing a first analog signal related to a significant portion of said numerical value, to actuate said motor means so as to place said transducer means near said desired positional relationship; and position control means responsive to a selected least significant portion of said numerical value for sensing the position of said transducer means to provide a second analog signal after said element means has been positioned near said desired positional relationship to finally actuate said motor means to place said transducer at said predetermined positional relationship with said magnetic record member in accordance with said numerical value, wherein said means for providing a first analog signal includes input means for receiving said numerical value as a binary code of n bits, and wherein said coarse positioning means is responsive to $(n-y)$ of the most significant of said $n$ bits to provide said first analog signal, said coarse positioning means includes means for sensing the instant positional relationship of said transducer means with reference to said record member to provide a position signal; means for comparing said first analog signal with said position signal to provide a difference signal; and means for providing said difference signal to said motor means to place said transducer means near said desired positional relationship, $n$ being greater than $y$ and both being integers.

2. A system according to claim 1 further including differentiating means coupled to receive said position signal to provide a velocity signal; and means for reducing said difference signal in accordance with said velocity signal, said position control means including means responsive to the $y$ least significant of said $n$ bits, and optics means for providing said second analog signal.

3. A system according to claim 1 wherein said position control means include optical detent means for positioning said transducer means in an indexed position with reference to said record member under control of index signals provided as a function of the $y$ least significant of the $n$ bits in said numerical value.

4. A system according to claim 3 wherein said optical detent means comprises: a uniformly segmented light member; a phase segmented light member affixed for relative motion to said uniformly segmented light member with positional changes of said transducer means with reference to said record member; means for selectively energizing at least one phase of said phase segmented member under control of said index signals; and means for sensing a null position relationship between said selected phase of said phase segmented member and said uniformly segmented member to establish a final positional relationship between said transducer means and said record member.

5. An element positioning system comprising:

input register means for receiving a numerical value in the form of a binary code of $n$ bits, $n$ being an integer, indicative of a desired element position;

linear motor means for moving said element to a position defined by the numerical value in said input means;

coarse position control means responsive to a significant portion of the numerical value in said input means and a present element position for providing a first control signal to said motor means to move said element near the position defined by said numerical value; and final position control means, operative after said element has moved near the position defined by said numerical value, responsive to a selective last significant portion of said numerical value and to the position of said element relative to a fixed member for providing a second control signal to said motor means to move said element to the position defined by said numerical value.

6. A system according to claim 5 wherein said coarse position control means comprises means responsive to $n-y$ of the most significant of said $n$ bits for providing a first signal, means for providing a second signal as a function of element position and means for providing said first control signal as a function of the difference between said first and second signals, $n$ being greater than $y$, $y$ being an integer.

7. A system according to claim 5 further including means for generating an element velocity signal and means for providing said first control signal as a function of the difference between said first and second signals and said velocity signal.

8. A system according to claim 5 wherein said final position control means include means for providing a third signal which is a function of the *y* least significant of said *n* bits, optic means including first and second optic masks, said first optic mask being movable with said element by said motor means and said second optic mask being fixed to said fixed member, means for providing outputs as a function of the relative positions of said first and second optic masks and means for providing said second control signal as a function of said outputs and said third signal.

9. A system according to claim 8 wherein said coarse position control means comprises means responsive to $n-y$ of the most significant of said *n* bits for providing a first signal, means for providing a second signal as a function of element position and means for providing said first control signal as a function of the difference between said first and second signals, *n* being greater than *y*, *y* being an integer.

10. A system according to claim 9 further including means for generating an element velocity signal and means for providing said first control signal as a function of the difference between said first and second signals and said velocity signal.

* * * * *